United States Patent [19]

Malm

[11] Patent Number: 5,127,046
[45] Date of Patent: Jun. 30, 1992

[54] PUSH/PULL MODEM INTERFACE CIRCUIT

[75] Inventor: Marvin F. Malm, Dallas, Tex.

[73] Assignee: Compaq Computer Corporation, Houston, Tex.

[21] Appl. No.: 539,867

[22] Filed: Jun. 18, 1990

[51] Int. Cl.⁵ .......................................... H04M 11/00
[52] U.S. Cl. ...................................... 379/98; 379/100; 375/7
[58] Field of Search .................. 379/98, 100, 402, 399, 379/401, 403, 404; 375/7, 8, 9

[56] References Cited

U.S. PATENT DOCUMENTS

| | | | |
|---|---|---|---|
| 4,440,987 | 4/1984 | Heep et al. | 379/98 |
| 4,489,222 | 12/1984 | Lusignan et al. | 379/402 |
| 4,951,309 | 8/1990 | Gross et al. | |
| 4,987,586 | 1/1991 | Gross et al. | |

*Primary Examiner*—James L. Dwyer
*Assistant Examiner*—Ahmad F. Matar
*Attorney, Agent, or Firm*—Pravel, Gambrell, Hewitt, Kimball & Krieger

[57] ABSTRACT

A push-pull amplifier is used to drive a center tapped transformer in a modem/telephone line interface. The analog modem transmit signal is amplified and inverted, with the positive signal driving one end of the secondary and the inverted signal driving the second end and the center tap. This allows a lower voltage to be used to power the push-pull amplifier. A receive amplifier sums the signal at the second end of the secondary and the positive transmit signal to develop and amplify the analog signal received over the telephone line and transformed by the transformer. Zener diodes are placed in series in the telephone line to develop spikes on the secondary. If the magnitude of those spikes exceeds a predetermined level a ring indication signal is provided.

9 Claims, 4 Drawing Sheets

FIG. 6

PUSH/PULL MODEM INTERFACE CIRCUIT

BACKGROUND OF THE INVENTION

1. Field of the Invention

The present invention relates to circuitry used to connect the analog input or output signals of a modem chip to a telephone line.

2. Description of the Related Art

Computer systems often need to communicate with each other by means of the telephone lines. Certain interfaces must be utilized to perform this communication. The telephone system uses analog signals, whereas the computer is a digital device. To this end a device called a modem is used to convert the computer digital signals from a series of b 1's and 0's into a series of analog tones which are then transmitted over the telephone lines to a matching modem connected to a second computer system. The second modem receives the analog tones and converts them to digital signals for transmission to the second computer.

Several problems arise in performing these translations of analog to digital and digital to analog. One is that the telephone interface is really a two wire system as implemented with full duplex capabilities, so that information is being transmitted and received over the same two wires at the same time. This is unacceptable for a digital computer system and so the modem must convert from two wires to four wires, which include receive, transmit, ring indication and ground signals. This four wire system can then be provided to a modem chip which converts the received analog signals into digital signals and provides transmitting analog signals from digital signals provided by the computer. The ring indicator output can go directly to the computer for its analysis.

Typically a transformer is used to help perform this translation to provide isolation and balancing needed for the telephone lines and to separate the various digital and power supply grounds from the telephone line interface. Conventionally a center tapped transformer is used in this application. In prior designs the center tap of the transformer was connected to ground while one leg of the computer side of the transformer was connected to a receive amplifier circuit and the other leg was connected to a transmit amplifier circuit. The problem that developed was that a 6 to 8 volt peak to peak signal had to be supplied by the transmit amplifier circuitry to properly drive the transformer to provide the necessary signal amplitude over the telephone lines for proper transmission and reception at the other end. When conventional operational amplifier circuitry is used, voltages greater than the peak to peak output voltages are necessary because of voltage drops contained in the operational amplifier. Therefore, for practical reasons 10 to 12 volts, either split or single supply, was required to power the transmit amplifier circuitry to properly produce the 6 to 8 volt peak to peak drive signal.

However because most parts of computer systems operated on 5 volt this need to develop 10 to 12 volts to allow the modem interface to couple to the telephone lines became a problem in that a separate power supply portion had to be used. Thus there was need to develop circuitry which allowed only a single 5 volt supply to power the modem interface circuitry used to couple the computer system to the telephone line.

Ring detect circuitry was also relatively complicated. Elaborate optocouplers, diode, capacitor and resistor networks were needed because of the high voltages present during ring and the need for isolation. The circuitry was elaborate and expensive.

SUMMARY OF THE INVENTION

The modem/telephone line interface of the present invention can operate on only a single 5 volt supply and includes operational amplifier circuitry. The output amplifier section in the transmitter portion has a push-pull output stage which is coupled to the center tap and one leg or end of the computer side of a conventional transformer. The true or positive version of the signal provided from the modem chip is coupled to the first end of the transformer and an inverted version of the signal is coupled to both the center tap and the second end of the transformer. By use of the push-pull circuit it is thus possible to provide a sufficient signal to the transformer to provide suitable voltages on the telephone line.

Because the center tap of the transformer is no longer coupled ground but is driven by the output amplifier, the input of the receive operational amplifier is no longer ground referenced and therefore the signal provided from the second end of the transformer is combined with the signal produced by the push-pull amplifier for driving the first end of the transformer so that the transmitted signal is effectively cancelled by this addition and thus only the received signal is amplified by the receive operational amplifier.

Additionally, a simplified ring detector is included. The ring line of the telephone line is coupled to the transformer around the on hook relay via back-to-back Zener diodes. The Zener diodes limit the voltage supplied to the transformer in ring cases so that a spike is developed at each ring pulse on the secondary of the transformer. The received signal is then evaluated by a threshold comparator which is coupled to a pulse extender. The threshold comparator determines whether a received signal over a certain magnitude, indicative of the spike developed during a ring, has been received. The pulse extender is optionally used to extend the triggering signal so that should the computer be in a polling mode the ring indication signal to the computer is present for a greater period to increase the probability of its presence when the computer polls the ring indication input. Thus this allows a ring signal to be adequately held to assure acknowledgement by the computer.

Thus these circuits allow the modem interface of the present design to operate from only 5 volts and simplify the ring detect circuitry.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
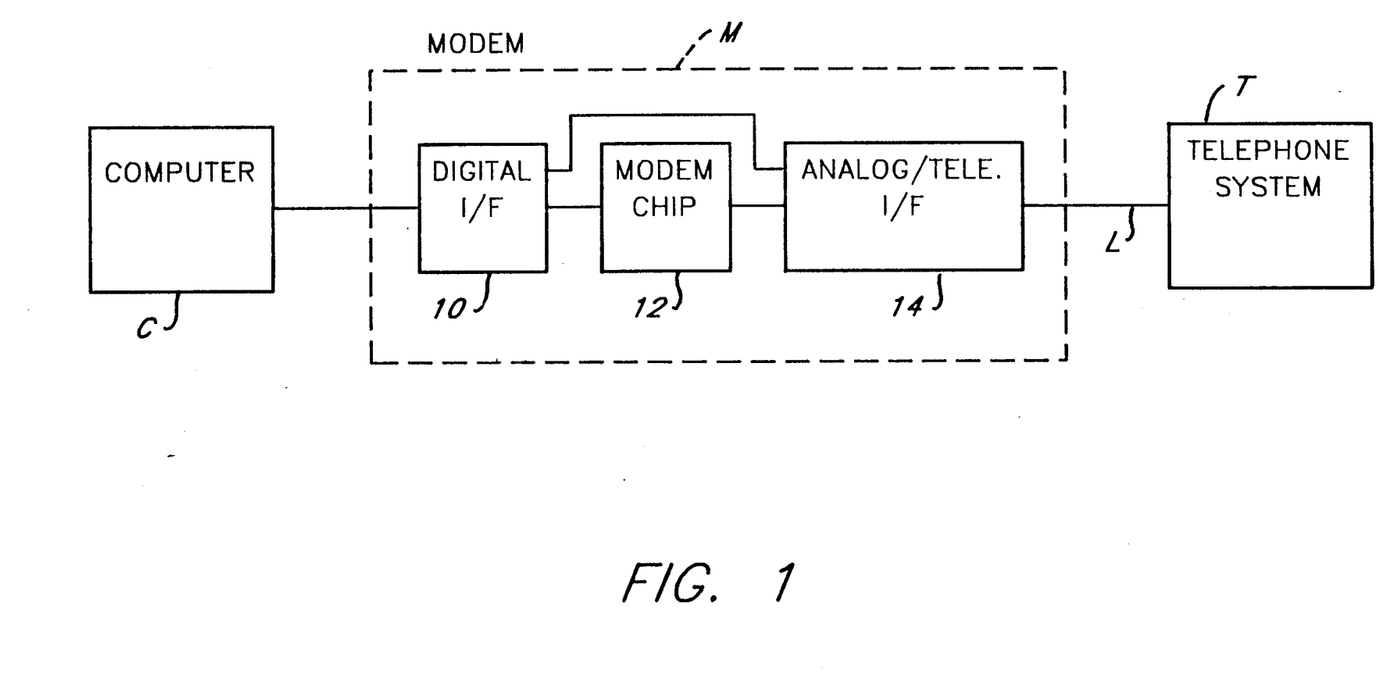
FIG. 1 is a block diagram of a computer system showing connection between the computer and the telephone system.

Referring now to FIG. 1, a computer generally referred to by the letter C is connected to a modem M which in turn is connected to the telephone system T over a two wire telephone line L. The modem M contains three function blocks, the digital interface 10, the modem chip 12 and the analog/telephone interface 14. The modem chip 12 communicates digitally to the computer C through the digital interface 10 and using an analog frequency basis through the analog/telephone interface 14 to the telephone system T. The modem chip 12 includes the necessary circuitry to convert the received analog signal to a digital signal and the received digital signal to an analog signal. These modem chips 12 are quite well known and have reached the state where they are integrated onto a single integrated circuit or chip to allow dramatic simplification and size reduction of a modem M. The digital interface 10 can be of the type necessary for the particular modem M. In some cases where the modem M is connected over a serial link to the computer C, the digital interface transforms the voltage levels provided by the computer C to those compatible with the modem chip 12 and provides necessary isolation. If the modem M is located inside the computer C in a bus type configuration, the digital interface 10 includes the necessary circuitry to receive and transmit the digital information from the computer C to the modem chip 12, including registers, address decode and other items as necessary.

The modem chip 12 produces analog signals of the desired frequency to transmit over the telephone line L and receives the signals transmitted across the telephone line L to the modem M. These signals are at an improper voltage level for direct use by the modem chip 12, are not sufficiently isolated and are bidirectional on different wires, so the levels must be corrected and a conversion must be done between a four wire system used with the modem chip 12 and the computer C and the two wire system used in the telephone line L. The analog/telephone interface 14 performs these level shifting and combination functions and additionally determines when a ring signal is being received to indicate to the computer C that a call is being placed to the system.

Figure 2:
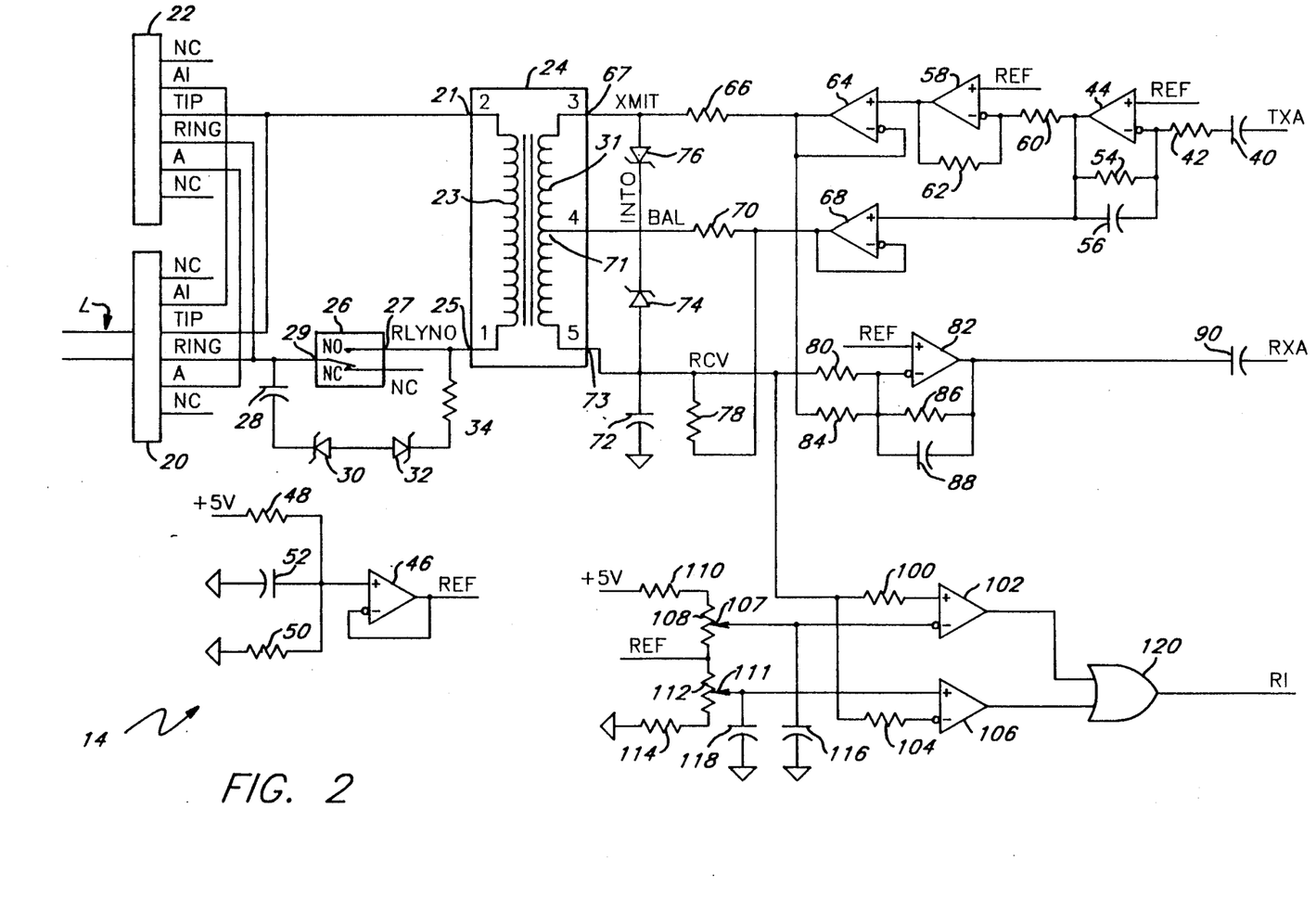
FIG. 2 is a schematic diagram of a discrete circuit implementation of a circuit according to the present invention.

A discrete circuit implementation of the modem interface 14 is shown more fully in FIG. 2. The telephone line L is connected to a first connector 20 designed to receive the standard connector such as an RJ-11 used with the telephone lines L. A second connector 22 is wired in parallel with the first connector 20 to allow a telephone set to be connected if desired without the need for installing a second socket at another location. The two signals or wires in the telephone line L are connected to the TIP and RING signals as provided from the connector 20, which are then the signals over which the incoming signal is transmitted to the computer system. The TIP signal is connected to one terminal 21 of the primary winding 23 of a transformer 24 which is used to isolate the telephone line L from the modem 12. The transformer 24 is a conventional center tapped transformer as commonly used to connect modems M to the telephone lines L. The second terminal 25 of the primary winding 23 of the transformer 24 is connected to a normally open contact 27 of a relay 26.

The arm 29 of the relay 26 is connected to the RING signal. The relay 26 is used to take the modem M off hook when a call is to be placed or an incoming call is detected. A parallel path around the relay 26 from the RING signal to the relay normal open contact 27 is provided by the series connection of a capacitor 28, two Zener diodes 30 and 32 and a resistor 34. The Zener diodes are preferably configured so that the anodes are connected. In this configuration the ring voltage, which is typically 90 volts, is received. The Zener diodes 30 and 32, which preferably have a reverse break down voltage of approximately 10 volts, are triggered and provide a clipped wave form to the transformer 24 which, when transmitted through the transformer 24 and in combination with the capacitor 28, produces impulses or spikes on the secondary 31 of the transformer 24. These impulses or spikes are used by the ring detection circuitry as will be explained.

The TXA or transmit analog signal received from the modem chip 12 is connected to a DC blocking capacitor 40, which is connected in series to a resistor 42. The series resistor 42 is connected to the inverting input of an operational amplifier 44, whose non-inverting input is connected to a signal called REF or reference. The REF signal is a DC voltage which is used to bias the signal produced by the operational amplifier 44 into the active zone because preferably the operational amplifier 44 is a single supply unit operation from 5 volts and ground. For this reason a bias voltage is necessary to cause the AC coupled signal produced by capacitor 40 to remain within the active region of the operational amplifier 44.

The REF signal is produced as the output of an operational amplifier 46 which is configured in voltage follower mode. A resistor network connected between ground and 5 volts consists of series resistors 48 and 50, which are preferably like resistors, so that the reference set point at the non-inverting input of the operational amplifier 46 is 2.5 volts or approximately ½ the supply voltage. A capacitor 52 is coupled from the non-inverting input of the operational amplifier 46 to ground to provide noise rejection. Thus the REF signal has a preferred voltage of 2.5 volts, which is ½ of the supply voltage, to allow the signals to be properly biased for good operation.

The operational amplifier 44 is connected in an inverting mode with grain configuration, with a feedback resistor 54 and feedback capacitor 56 being configured such that in the preferred embodiment a gain of $-2.8$ is developed. The output of the operational amplifier 44 is connected to the inverting input of a second operational amplifier 58 through a resistor 60. The operational amplifier 58 is connected in inverting unity gain mode with a feedback resistor 62 being of an equal value as the resistor 60. The REF signal is provided to the non-inverting input for voltage bias purposes. In this manner the output of the operational amplifier 58 is in phase with the TXA signal and amplified. The output of the operational amplifier 58 is provided to the non-inverting input of an amplifier 64 which is configured in voltage follower mode. The output of this operational amplifier 64 is coupled to an outer terminal o end 67 of the primary winding 31 of the transformer 24 through a series terminating resistor 66. The terminating resistor 66 provides the termination impedance for one portion of the transformer 24.

The output of the operational amplifier 44 is also connected to the non-inverting input of an operational amplifier 68. The operational amplifier 68 is connected in voltage follower mode and thus produces at its output an inverted version of the TXA signal which has been amplified by the operational amplifier 44. Therefore the signals produced by the operational amplifiers 64 and 68 are 180° out of phase and of equal amplitude. For reasons to be explained it is highly preferred that the amplitudes be closely matched and that the signals be highly synchronized but 180° out of phase. The output of the operational amplifier 68 is provided through a series balancing resistor 70 to the center tap 71 of the primary winding 31 of the transformer 24. Thus the output of the operational amplifier 68 is the reference voltage for the transformer 24. The output of the operational amplifier 68 is also provided through a terminating resistor 78 to the second outer terminal or leg 73 of the primary winding 31 of the transformer 24. Thus the transformer 24 receives at one portion of the primary winding 31 a positive version or true but amplified version of the TXA signal, while at center tap 71 and other portion of the primary winding 24 receive an inverted and amplified version of the TXA signal, so that the effective signal being received by the transformer 24 is twice that developed by either operational amplifier 64 or 68 because of the resulting push-pull configuration. Thus the voltage developed at the primary 23 of the transformer 24 is sufficient to provide the drive signal necessary to drive the telephone lines L without the need for high voltage supplies to the modem interface circuitry 14.

The second outer terminal 73 of the primary winding 31 of the transformer 24 is the receive signal and is coupled to ground by a capacitor 72 for radio frequency bypassing. A series of Zener diodes 74 and 76 are connected between the two outer terminals 67 and 73 of the primary winding 31 of the transformer 24, with the cathodes of the Zener diodes 74 and 76 connected together. The Zener diodes 74 and 76 are preferably 5.1 volt diodes and are to prevent damage to the portions of the circuitry should an overvoltage condition be received from the telephone line L. A series resistor 80 is connected to the second outer terminal 73 and to the inverting input of a receive operational amplifier 82. The output of the positive TXA signal amplifier 64 is connected through a resistor 82 having a like value as the resistor 80 to the inverting input of the operational amplifier 82. In this way the positive version of the TXA signal is summed with the received signal from the transformer 24 to counteract the effect of driving the center tap 71 with the inverse TXA signal by operational amplifier 68. This summation corrects for the non-grounded reference now used with transformer 24. It is because of this counter-acting effect of the addition performed by the resistor 84 and the operational amplifier 82 that it is desirable that the balance of the drives of the operational amplifiers 64 and 68 be highly matched so that voltage errors are not induced in the addition.

The operational amplifier 82 has connected to its non-inverting input the REF signal to allow a positive bias to be developed. The operational amplifier 82 is preferably connected in an inverting with gain condition configuration by means of a feedback resistor 86 and a feedback capacitor 88. In the preferred embodiment the gain is −3.2 times. The output of the operational amplifier 82 is connected through a series capacitor 90 to form the RXA or receive analog signal which is provided to the modem chip 12 for its conversion to a digital received signal.

The RCV signal produced at the second outer terminal 73 of the primary of the transformer 24 is also provided to comparator circuitry to help determine if a ring signal is present. The RCV signal is provided through a series resistor 100 to the noninverting input of an operational amplifier 102 configured as a comparator and through a series resistor 104 to the inverting input of an operational amplifier 106 configured as a comparator. The operational amplifiers 102 and 106 are configured in comparator mode or open loop with the positive drive of the operational amplifiers being desirable in this particular instance. The inverting input of operational amplifier 102 is connected to the wiper arm 107 of a potentiometer 108 which has one end connected to 5 volts through a series resistor 110 and the other end connected to the REF signal. The non-inverting input of the operational amplifier 106 is connected to the wiper arm 111 of a potentiometer 112 which has one end connected to the REF signal and the other end connected through a series resistor 114 to ground. In this way reference voltages are applied to the inverting input of the operational amplifier 102 and the non-inverting input of the operational amplifier 106 so that should the RCV signal ever exceed a certain magnitude the operational amplifiers 102 or 106 will signal such by driving their outputs high. The inverting input of operational amplifier 102 and the non-inverting output of the operational amplifier 106 are connected to ground through capacitors 116 and 118 respectively. The outputs of the operational amplifiers 102 and 106 are provided to the inputs of a two input OR gate 120, whose output is the RI or ring indication signal which is provided to the computer C. Thus whenever a spike of more than a given magnitude is provided on the RCV signal due to the action of the Zener diodes 30 and 32 and the ring or pulse dial voltage, a high level is developed out of the OR gate 120 to indicate that a ring signal may be present. The computer C is programmed to analyze this ring indication signal as will be described to determine if a true ring signal is being received or if it is merely the pulse dialing of a telephone set connected to the same telephone line L.

Thus the ring indication determination can be done very simply and easily on the computer side of the transformer 24 which is highly isolated and is an easier environment then the relatively rugged and uncontrolled environment of the telephone side.

Figure 3:
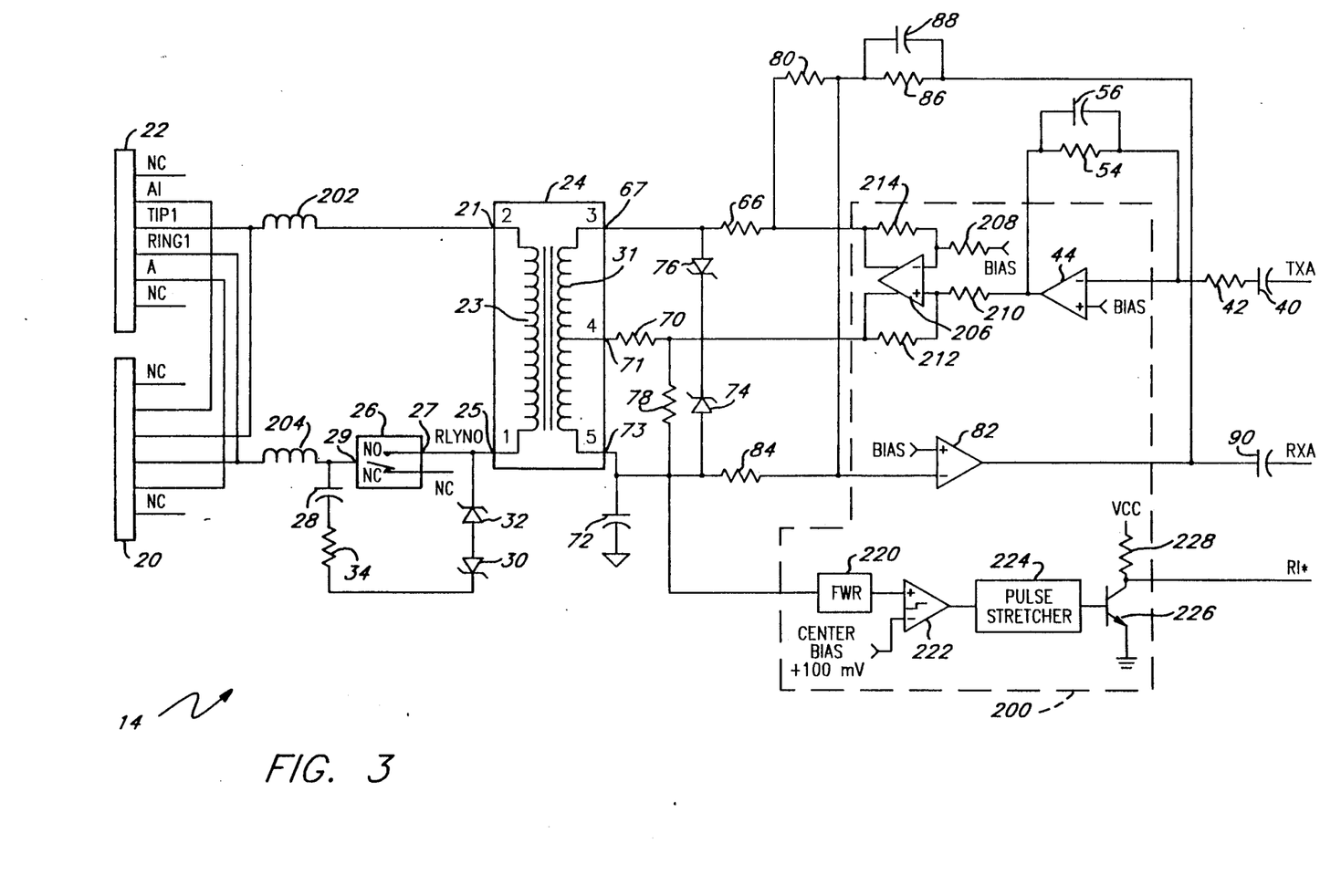
FIG. 3 is an implementation of the circuit of FIG. 2 particularly designed for use with an integrated circuit.

An alternate embodiment of the analog/telephone interface 14 is shown in FIG. 3. The circuitry of FIG. 3 is very similar to that in FIG. 2, but the operational amplifier and comparator portions have been combined into a single integrated circuit 200. This allows a size reduction and better matching of the push-pull drive circuitry for the transmit drivers. Like components between the FIGS. 2 and 3 are given like numbers. One difference between the two figures is that inductors 202 and 204 have been inserted in the TIP and RING lines to provide an electromagnetic interference reduction. The remaining differences are developed inside the integrated circuit 200. The three operational amplifiers 58, 64 and 68 have been replaced by a single push-pull operational amplifier 206 having inverted and non-inverted inputs and outputs. The operational amplifiers 44 and 82 receive a BIAS signal at their non-inverting inputs which is equivalent to the REF signal of the circuit of FIG. 2. The BIAS signal is provided through a resistor 208 to the inverting input of the operational amplifier 206. The output of the operational amplifier 44 is provided through a resistor 210 to the non-inverting input of the operational amplifier 206. A feedback resistor 212 is provided from the inverted output of the operational amplifier 206 to the non-inverting input while a feedback resistor 214 is provided from the non-inverted output to the inverted input. One advantage of the integrated circuit 200 and the push-pull operational amplifier 206 is that by reducing it to an integrated circuit form better level and phase matching of the output is more readily obtained.

The ring indicator circuitry is changed from that of FIG. 2. While the Zener diodes 30 and 32 are still present in the input stage to produce spikes or pulses on the secondary side 31 of the transformer 24, the second outer terminal 73 of the transformer primary 24 is connected to a full wave rectifier 220. The full wave rectifier 220 provides its output to the non-inverting input of a comparator 222, which has at its inverting input a center bias voltage with a slight additional offset of 100 millivolts which corresponds to desired ring pulse magnitude. The output of the comparator 222 is provided to a pulse stretcher 224 whose output in turn is connected to the base of an NPN transistor 226. The collector of the NPN transistor 226 is pulled up through a resistor 228 to 5 volts. Developed at the collector of the transistor 226 is the RI or ring indication signal which is provided to the computer C. The pulse stretcher 224 is provided to lengthen an RI signal pulse so that should the computer C poll the RI signal instead of having the RI signal connected to an interrupt, the RI signal will be present for a sufficient length of time to generally allow the computer C to detect any periods the RI signal is high or present. Thus this circuitry 220, 224 226 and 228 is in operation similar to the ring indicator circuitry of FIG. 2 in that whenever a spike or pulse greater than a preset amplitude is obtained, this is indicated to the computer C as a low level RI signal.

The computer C contains software to help determine if transitions on the RI signal indicates true rings or are pulses produced by a telephone set connected to the same telephone line L. The RI signal is preferably connected to an interrupt input of the computer C and is active on the falling edge of the RI signal. Additionally, the computer C preferably contains three timers, TIMER 1, TIMER 2 and TIMER 3. TIMER 1 and TIMER 2 both preferably provide interrupts when they complete or time out. TIMER I is retriggerable, while TIMER 2 is not retriggerable but can be reset without developing an interrupt.

Operation commences when the RI signal undergoes a high to low transition. Execution of interrupt operations RI (FIG. 5) commences. In step 300 TIMER 1 is started with a count period of preferably 39 milliseconds, plus or minus 1.5 milliseconds. This is the preferred period because according to Federal Communications Commission rules ring frequency must be between 15 and 67 Hz. The 15 Hz case results in a pulse from the transformer 24 every 29.3 to 37.3 milliseconds. The pulse period for the higher frequency ring is less and so TIMER 1 must only be set to slightly exceed the maximum interval. On the other hand dial pulses have a worst or shortest case of 39.5 milliseconds between pulses because of variables such as double pulses, varying pulse periods and varying pulse widths. However, this value is greater than the preferred 39 milliseconds for TIMER 1.

Figure 5:
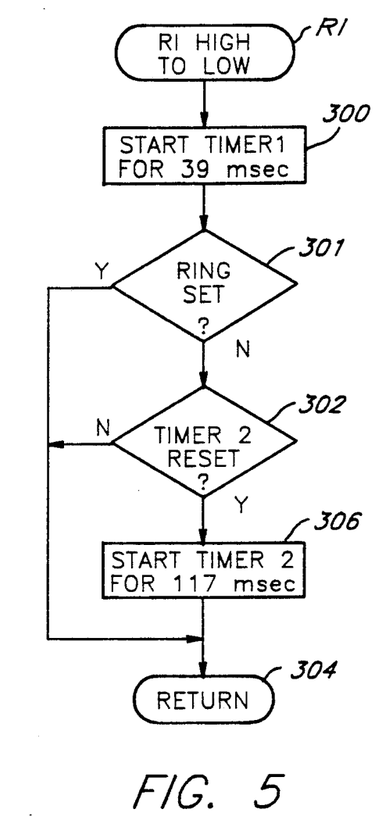

Control proceeds to step 301 to determine if a value referred to as RING is set. If RING is set, this is an indication that a ring cycle is in progress and nothing further need be done. If RING is set, control proceeds to step 304, a return to the interrupted instruction. If RING is not set, control proceeds to step 302 where the computer C determines the reset status of TIMER 2. If TIMER 2 is not reset but is active, control proceeds to step 304. If TIMER 2 is reset, it can be triggered and so TIMER 2 is started in step 306 with a period preferably three times that of TIMER 1, or 117 milliseconds in the preferred embodiment. Control proceeds to step 304.

Figure 6:
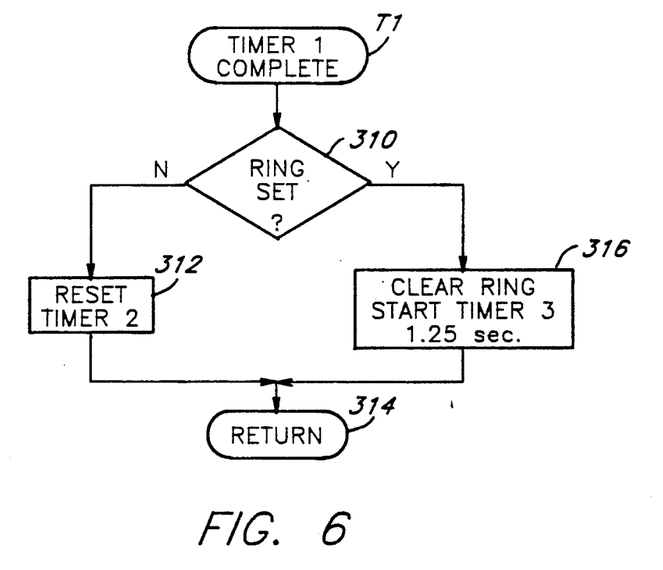

If dial pulses are occurring TIMER 1 will complete or time out because it has not been retriggered or restarted in step 300. When TIMER 1 completes, control proceeds to the TIMER 1 sequence T1 (FIG. 6). Operation commences at step 310 where the computer C determines if the value or variable referred to as RING has been set. When RING is set this is an indication that ring signals are being received and the attention of the computer C is requested. If in step 310 it is determined that RING is not set, control proceeds to step 312 where TIMER 2 is reset. This is the path taken during dial pulses. TIMER 1 has completed, but TIMER 2 has not, so it must be a dial pulse based on the above timings. Resetting TIMER 2 allows the entire ring detect procedure to restart. Control then proceeds to step 314 to return to the interrupted instruction.

If however RING is set in step 310, control proceeds to step 316 where RING is cleared and TIMER 3 is started for preferably 1.25 seconds. This clearing of RING is appropriate because TIMER 1 has stopped being retriggered and so the ring cycle must be completed. TIMER 3 is started so that a new ring cycle is not started under a sufficient period has elapsed to prevent one ring cycle from appearing as multiple rings. Control proceeds to step 314.

Figure 4:
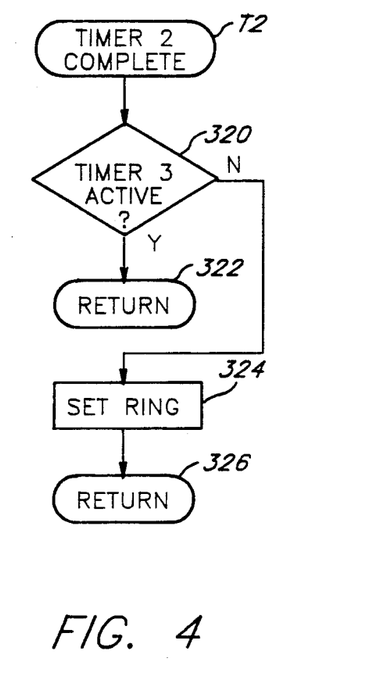
FIG. 4-6 are flowcharts of sequences for discriminating between rings and dial pulses.

When TIMER 2 completes or times out control proceeds to the TIMER 2 sequence T2 (FIG. 4). As a first operation the activity status of TIMER 3 is determined in step 320. If TIMER 3 is active, this is an indication that a second ring indication is being received within too short an interval. Control proceeds to step 322, a return to the interrupted instruction, if TIMER 3 is active.

If TIMER 3 is not active, control proceeds to step 324, where RING is set to indicate that several dial pulse periods have elapsed without TIMER 1 completing, so a ring cycle must be in progress. Control proceeds to step 326, a return. Thus a ring cycle can easily be distinguished from a dial pulse string.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A modem/telephone line interface between a two wire telephone line and a modem device producing an analog transmit signal and receiving an analog receive signal, comprising:

a transformer having the primary coupled to the two wires of the telephone line and a secondary having a center tap, a first end and a second end;

transmit amplifier means for receiving the analog transmit signal from the modem device and providing as outputs an amplified, positive form of the received signal and an amplified, inverted form of the received signal, said positive output being coupled to said first end of said transformer secondary and said inverted output being coupled to said center tap and said second end of said transformer secondary; and receive amplifier means for receiving signals provided over the telephone line and transformed by said transformer and providing an amplified form as said modem device analog receive signal, said receive amplifier receiving at an input the sum of the signal present at said second end of said transformer secondary and the positive output of said transmit amplifier means.

2. The interface of claim 1,
wherein said transmit and receive amplifier means are powered by a single supply voltage and further comprising:
means for establishing a bias voltage at approximately one half said signal supply voltage and providing said bias voltage as an input to said transmit and receive amplifier means to bias said amplifier means into an active region.

3. The interface of claim 1, wherein said
transmit amplifier means positive output is coupled to said first end of said transformer secondary by a terminating resistor and said transmit amplifier means inverted output is coupled to said second end of said transformer secondary by a terminating resistor and is coupled to said center tap of said transformer secondary by a balancing resistor.

4. a modem/telephone line interface between a two wire telephone line and a modem device producing an analog transmit signal and receiving an analog receive signal, comprising:
a transformer having a primary and a secondary, wherein said primary is coupled to said telephone line and said secondary is center tapped and has a first and a second end, wherein said primary is coupled to said telephone line through at least a series combination of a capacitor, a resistor and two Zener diodes, said Zener diodes having their anodes connected and having a breakdown voltage sufficient to clip the ring signal obtained over said telephone line and to develop spikes on said transformer secondary;

means coupled to one end of said transformer secondary for determining the magnitude of said spikes developed on said transformer secondary and producing a ring indication signal when said magnitude exceeds a predetermined value;

transmit amplifier means for receiving the analog transmit signal from the modem device and providing as outputs an amplified, positive form of the received signal and an amplified, inverted form of the received signal, said positive output being coupled to said first end of said transformer secondary and said inverted output being coupled to said center tap and said second end of said transformer secondary; and receive amplifier means for receiving signals provided over the telephone line and transformed by said transformer and providing an amplified form as said modem device analog receive signal, said receive amplifier receiving at an input the sum of the signal present at said second end of said transformer secondary and the positive output of said transmit amplifier means.

5. The interface of claim 4, further comprising:
means for developing a reference voltage indicative of said ring induced spike exceeding a predetermined value;
a full wave rectifier coupled to said second end of said transformer secondary and having an output; and
a comparator having said reference voltage connected at one input and the output of said full wave rectifier connected at a second input and producing an output signal when said full wave rectifier output level exceeds said reference voltage.

6. The interface of claim 4, further comprising:
means for developing a reference voltage indicative of said ring induced spike exceeding a quiescent voltage level by a predetermined value;
means for developing a reference voltage indicative of said ring induced spike being less than a quiescent voltage level by a predetermined value;
positive going comparator means having said exceeding reference voltage as one input and said second input coupled to one end of said transformer secondary to receive said received voltage and producing an output signal when said received voltage exceeds said exceeding reference voltage;
negative going comparator means having said less than reference voltage as one input and sid second input coupled to one end of said transformer secondary to receive said received voltage and producing an output signal when said received voltage is less than said less than reference voltage; and
means for combining said comparator means outputs to produce an output signal when either of said comparators is producing an output signal.

7. The interface of claim 4,
wherein said transmit and receive amplifier means are powered by a single supply voltage and further comprising:
means for establishing a bias voltage at approximately one half said signal supply voltage and providing said bias voltage as an input to said transmit and receive amplifier means to bias said amplifier means into an active region.

8. The interface of claim 7, further comprising:
means for developing a reference voltage indicative of said ring induced spike exceeding a predetermined value;
a full wave rectifier coupled to aid end of said transformer secondary and having an output; and
a comparator having said reference voltage connected at one input and the output of said full wave rectifier connected at a second input and producing an output signal when said full wave rectifier output level exceeds said reference voltage.

9. The interface of claim 7, further comprising:
means for developing a reference voltage indicative of said ring induced spike exceeding a quiescent voltage level by a predetermined value;
means for developing a reference voltage indicative of said ring induced spike being less than a quiescent voltage level by a predetermined value;
positive going comparator means having said exceeding reference voltage as one input and a second input coupled to one end of said transformer secondary to receive said received voltage and producing an output signal hen said received voltage exceeds said exceeding reference voltage;

negative going comparator means having said less than reference voltage as one input and a second input coupled to one end of said transformer secondary to receive said received voltage and producing an output signal when said received voltage is less than said less than reference voltage; and means for combining said comparator means outputs to produce an output signal when either of said comparators is producing an output signal.

* * * * *

UNITED STATES PATENT AND TRADEMARK OFFICE
CERTIFICATE OF CORRECTION

PATENT NO. : 5,127,046

DATED : JUNE 30, 1992

INVENTOR(S) : MARVIN F. MALM

It is certified that error appears in the above-identified patent and that said Letters Patent is hereby corrected as shown below:

COL. 10, LINE 29, CHANGE "sid" TO --said--.

COL. 10, LINE 51, CHANGE "aid" TO --said--.

COL. 11, LINE 1, CHANGE "hen" TO --when--.

Signed and Sealed this

Twenty-first Day of September, 1993

Attest:

Attesting Officer

BRUCE LEHMAN

Commissioner of Patents and Trademarks